May 24, 1949. E. H. ALDEBORGH ET AL 2,470,755
BORE GAUGE
Filed April 24, 1945 2 Sheets-Sheet 1
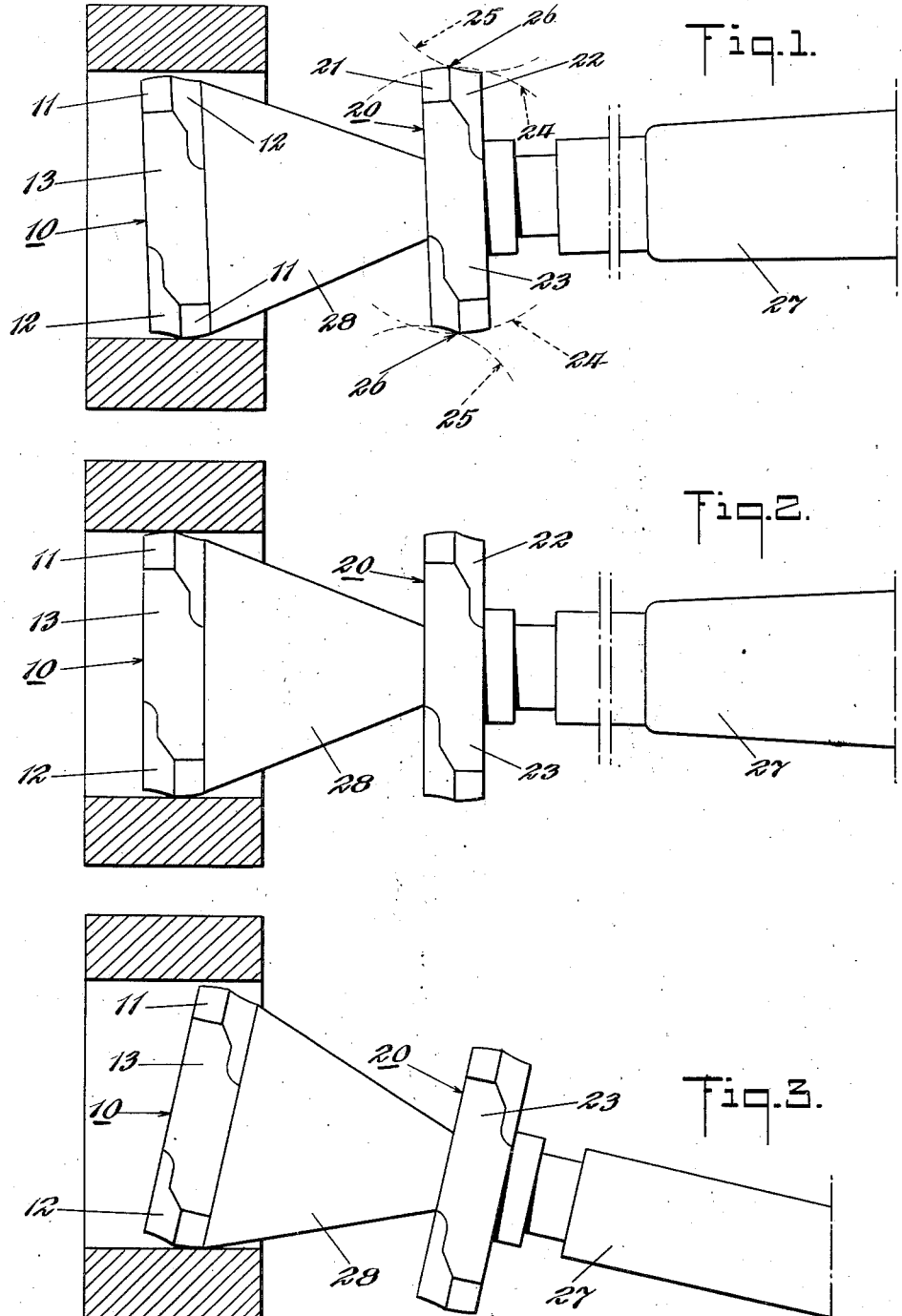
INVENTORS
ERIK H. ALDEBORGH
ALFRED H. EMERY
BY Daly & Daly
ATTORNEYS INVENTORS
ERIK H. ALDEBORGH
ALFRED H. EMERY
BY Darby & Darby
ATTORNEYS Patented May 24, 1949

UNITED STATES PATENT OFFICE 2,470,755

BORE GAUGE

Erik H. Aldeborgh, Poughkeepsie, and Alfred Hamilton Emery, Wappingers Falls, N. Y., assignors to Standard Gage Company, Inc., Poughkeepsie, N. Y., a corporation of New York Application April 24, 1945, Serial No. 590,010

3 Claims. (Cl. 33—178)

The present invention relates to a bore gage and particularly to a bore gage in which the measuring surface comprises the juncture between an equatorial zone of a sphere and a relieved surface adjacent thereto.

More particularly still the present invention relates to a gage of the above mentioned type in which the "go" and "no go" members are arranged on a common shaft for progressive entry into the bore to be gaged and not on opposite ends of a handle as is common with bore gages.

In our copending application Serial No. 561,651 there is disclosed a gage of the type in which the measuring surface is the line of juncture between the equatorial zone of a sphere and an adjacent relieved surface but in this gage the "go" and "no go" members are mounted on the opposite ends of a common handle. For the normal usage in measuring deep bores, the gage of the above mentioned copending application is ideal. However, when it is desirable to measure a shallow bore as, for example, the internal diameter of a bearing race, it is more convenient to measure by means of a gage in which the "go" and "no go" members are on the same end of a handle so that these measurements may be made progressively without the necessity of reversing the gage. Furthermore, it is possible to measure progressively in the case of a shallow bore, since the gaging members may be spaced sufficiently far apart so that there will be no interference with the walls of the bore due to the fact that the first inserted member may protrude from the far side of the bore, while the second inserted member is being utilized for gaging.

Our present invention, as has been indicated above, combines the two gaging members upon the same end of a single shaft or handle and provides means to render the removal of the gage from the bore readily accomplished and eliminates the probability of jamming the piece gaged between the gaging members.

It is an object of the present invention to provide a progressive type bore gage the gaging members of which are joined by a surface which permits ready removal of the gage from the gaged piece.

It is a further object of our invention to provide such a gage in which the measuring members comprise equatorial zones of spheres and adjacent clearance surfaces.

It is a further object of our invention to provide a gage which is extremely convenient in the gaging of shallow bores such as bearing races.

Other objects and features of our invention will appear when the following description is read in connection with the accompanying drawings in which—

Figure 1 is a view of the gage of the instant invention showing the "go" member in the bore of a workpiece prior to clockwise rotation of the gage to perform the measuring operation.

Figure 2 is a view similar to Figure 1 but showing the gage after clockwise rotation thereof in continuance of the checking operation on the piece. In this view the diameter of the workpiece is below the gaging limits, i. e. the diameter of the piece is too small.

Figure 3 is a view similar to Figure 2 showing the condition which exists when the checking operation is performed upon a workpiece which is above the minimum limit or in other words larger than the "go" member.

Figure 5, furthermore, illustrates the use of a conical surface connecting the "go" and "no go" members and forming a guiding surface for the removal of the gage from the workpiece.

Figure 4:
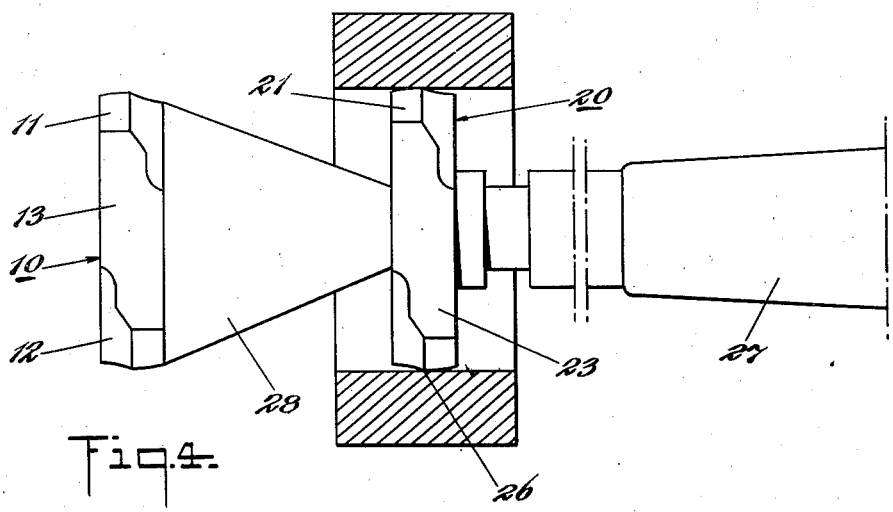
Figure 4 shows the gage of our invention with the "no go" member thereof inserted in the workpiece and oscillated in the gaging operation. This view illustrates the condition when the diameter of the piece is not larger than the maximum limit, that is when its diameter is less than that of the "no go" member.

Referring now to the drawings, there is shown at 10 a gaging body for the minimum or "go" diameter, this gaging body comprising an equatorial zone 11 of a sphere. The spherical equatorial zone is relieved as is shown at 12 to provide a clearance and the actual gaging surface is the line of juncture between the spherical surface of the equatorial zone 11 and the relieved adjacent area 12. The equatorial zone 11 as well as the clearance area 12 is cut away at the sides of the gage, as indicated at 13, in order to make the gage more readily insertable in a bore and in order to enhance the ability of the gage to detect an out-of-round condition of the bore, all as has been described in our copending application above mentioned.

To the right of the "go" member 10 there is a similar member 20 which comprises the "no go" gaging member. This member is identical with the "go" member except for its diameter and comprises the spherical equatorial zone 21, the adjacent relieved clearance area 22 and the cut away side portions 23. The measuring diameter of the "no go" member 20 is that of the sphere indicated by the dotted lines 24 of Figure 1. The clearance surfaces are concave in form, as is indicated by the dotted lines 25 of Figure 1, thereby forming a sharp edge at 26 which is the measuring diameter and which likewise serves to remove any foreign matter which may be present in the bore and to give an accurate measurement.

The two gaging members 10 and 20 are mounted on a common handle 27 and are spaced apart a distance greater than the width of any piece which is to be checked by use of the gage. Extending between the two gaging members 10 and 20 is a conical member 28 which at its left hand end is of the same diameter and configuration as the righthand side of the "go" member 10 of the gage and which tapers toward the right and is of materially lesser cross-section at its righthand than at its lefthand end. This conical member serves to guide the gage in its removal from a workpiece, as will be apparent upon inspection of the various figures of the drawing, particularly of Figure 5.

Figure 2 shows the gage of Figure 1 after a clockwise rotation which is performed by utilizing the weight of the handle only so that no undue pressure is exerted upon the walls of the bore and no scratching action can occur. The illustration of Figure 2 shows the position of the gage when a piece is measured the diameter of which is smaller than the measuring diameter of the "go" member 10. Such a piece would, of course, be rejected, as being undersize.

Figure 3 shows the position of the gage when the diameter of the workpiece is greater than the diameter of the "go" member 10 of the gage. This piece has a minimum diameter which is greater than the diameter of the member 10 and is, therefore, above the minimum limit which the gage is designed to check.

Figure 4 shows the gage of our present invention with the "go" member having been inserted through the bore subsequent to the measuring operation performed thereby and with the "no go" member in the bore of the piece being checked. The condition illustrated in Figure 4 is that in which the diameter of the workpiece is less than the measuring diameter of the "no go" member 20 of the gage and, consequently, the piece being checked is below the maximum limit.

Figure 5:
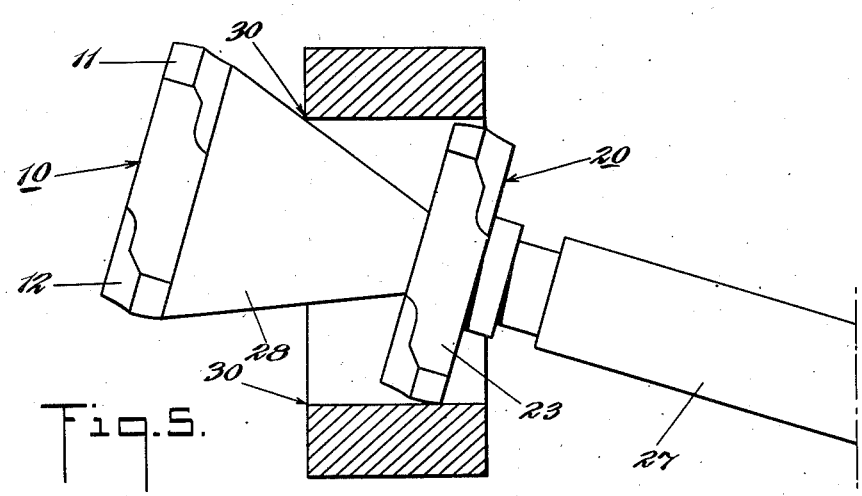
Figure 5 is a view similar to Figure 4 but illustrating the condition when the diameter of the workpiece is greater than that of the "no go" member or is, in other words, outside the gaging limits.

Figure 5 illustrates the same operation as Figure 4 but performed on a piece the diameter of which is greater than the measuring diameter of the member 20. Such a condition demonstrates that the diameter of the piece is greater than the maximum tolerance allowed and, consequently, such a piece would be rejected as oversize.

Reference to Figure 5 will also show that the gage may be readily removed from the bore because the edge 30 of the workpiece will strike the tapered or conical surface 28 and will thereby cause the "go" member to center itself in the bore of the piece and guide the gage for removal. It will be seen that should the "go" and "no go" members be spaced on the handle or shaft 27 for progressive gaging without the use of the conical member 28 it would be possible and in fact probable that the gaging members 10 and 20 would, during the removal of the gage from the workpiece, come to lie one on either side of the workpiece and it would be extremely difficult to hold the gage in a horizontal position and at the same time accurately center the gage member 10 with respect to the bore of the workpiece so that the gage could be removed.

While we have described a preferred embodiment of our invention it will be understood that other forms thereof may be devised. For example, the surface of member 28 need not be strictly conical but may be some other shape having its smaller dimension adjacent the maximum gaging member, and its larger dimension substantially flush with the adjacent surface of the minimum gaging member.

What is claimed is:

1. In a progressive bore gage, in combination, a handle, a maximum and a minimum gaging member both said members being mounted on the same end of said handle and spaced apart, and a guiding member between said gaging members, said guiding member being substantially flush with the adjacent periphery of the minimum gaging member and diminishing toward the end of the maximum gaging member to provide clearance for locking either gaging member in the bore and to serve as a guide for withdrawal of the gage after said minimum member has passed beyond the end of a through bore.

2. In a progressive bore gage, in combination, a handle, a maximum and minimum gaging member both said members being mounted on the same end of said handle and spaced apart, a substantially conical frustum having its base the same exterior contour as that of the minimum gaging member and lying adjacent thereto, said conical frustum extending in a direction such that its apex lies adjacent the maximum gaging member, said gaging members and conical frustum being concentrically fixed to said common handle.

3. In a progressive bore gage, in combination, a handle, a maximum gaging member mounted on said handle with its center coinciding with the axis of the handle, a conical frustum mounted on said handle with its apex adjacent the surface of said maximum gaging member, said conical frustum being concentric with said handle and maximum gaging member, and a minimum gaging member mounted on said handle adjacent the base of said conical frustum, said minimum gaging member being likewise concentric with said conical frustum, said maximum gaging member, and the axis of said handle, whereby said conical frustum permits tilting of the gage in the bore and forms a guide to facilitate the entrance of the minimum gage member into the bore during withdrawal of the gage from a through bore.

ERIK H. ALDEBORGH.
ALFRED HAMILTON EMERY.

REFERENCES CITED

The following references are of record in the file of this patent:

UNITED STATES PATENTS

| Number | Name | Date |
| --- | --- | --- |
| 1,514,250 | Briney | Nov. 4, 1924 |

FOREIGN PATENTS

| Number | Country | Date |
| --- | --- | --- |
| 291,286 | Great Britain | May 31, 1928 |
| 486,734 | Great Britain | June 9, 1938 |
| 520,065 | Great Britain | Apr. 12, 1940 |